United States Patent
Uozumi et al.

(10) Patent No.: US 12,365,313 B2
(45) Date of Patent: Jul. 22, 2025

(54) SUPPORT STRUCTURE FOR RAIN SENSOR

(71) Applicant: TOYOTA JIDOSHA KABUSHIKI KAISHA, Aichi-ken (JP)

(72) Inventors: Yoshinori Uozumi, Toyota (JP); Shiroh Chiba, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 100 days.

(21) Appl. No.: 18/447,305

(22) Filed: Aug. 10, 2023

(65) Prior Publication Data

US 2024/0208466 A1 Jun. 27, 2024

(30) Foreign Application Priority Data

Dec. 23, 2022 (JP) ................. 2022-206178

(51) Int. Cl.
*G01K 3/00* (2006.01)
*B60S 1/08* (2006.01)

(52) U.S. Cl.
CPC ........... *B60S 1/0881* (2013.01); *B60S 1/0833* (2013.01)

(58) Field of Classification Search
CPC .............................. B60S 1/0881; B60S 1/0833
See application file for complete search history.

(56) References Cited

U.S. PATENT DOCUMENTS 6,296,381 B1 10/2001 Sinn et al.
2020/0384826 A1* 12/2020 Sasaki ................ B60H 1/00785

FOREIGN PATENT DOCUMENTS

| JP | 3020807 U | 2/1996 |
| JP | 2001-517175 A | 10/2001 |
| JP | 2022125594 A | 8/2022 |
| WO | 2022176470 A1 | 8/2022 |

* cited by examiner

*Primary Examiner* — Muhammad S Islam
(74) *Attorney, Agent, or Firm* — HAUPTMAN HAM, LLP

(57) ABSTRACT

A mounting bracket is fastened to a roof header panel. The mounting bracket has an extending portion extended to a position facing a windshield. A rain sensor is engaged with the extending portion so that the rain sensor can move back and forth with respect to the windshield. A coil spring is interposed between the extending portion and the rain sensor, and a light emitting/receiving surface of the rain sensor is pushed toward the inner surface of the windshield through a silicone sheet by a biasing force from the coil spring. Since there is no need to use adhesion as a means of supporting the rain sensor, there is no need to control or inspect the quality of the adhesion.

3 Claims, 3 Drawing Sheets

SUPPORT STRUCTURE FOR RAIN SENSOR

TECHNICAL FIELD

This invention relates to a support structure for a rain sensor.

BACKGROUND ART

Rain sensors have been known in the past (Patent Literature 1). Conventional rain sensors are attached to the inner surface of the windshield glass of a vehicle. The rain sensor has a light emitting element and a light receiving element. The light emitting element irradiates light onto the windshield glass. The light-receiving element receives the light reflected by the windshield glass. The rain sensor detects raindrops on the outer surface of the windshield glass based on the amount of light received by the light receiving element. When the rain sensor detects raindrops, it sends a raindrop detection signal to the wiper device.

FIG. 3 shows a cross-sectional view of the support structure of a conventional rain sensor a. In this FIG. 3, arrow FR indicates the front direction of the vehicle body, arrow RR indicates the rear direction of the vehicle body, and arrow UP indicates the upward direction.

As shown in FIG. 3, a conventional rain sensor a is attached to the inner surface of a windshield glass c by a mounting bracket b. The mounting bracket b has a cylindrical portion d and an adhesive portion e. The cylindrical portion d surrounds the outer periphery of the rain sensor a and holds the rain sensor a. The adhesive portion e is bonded to the inner surface of the windshield glass c. A spring member g is engaged with the mounting bracket b. The spring member g exerts a biasing force against the mounting bracket b in a peeling direction. The rain sensor a is subjected to the reaction force of the spring member g. As a result, the light emitting/receiving surface f of the rain sensor a is pressed against the inner surface of the windshield glass c through a silicone sheet h. This prevents air bubbles from entering between t the light emitting/receiving surface f of the rain sensor a and the silicone sheet h, and between the silicone sheet h and the inner surface of the windshield glass c.

CITATION LIST

Patent Literature

[Patent Literature 1] JP2022-0

SUMMARY OF INVENTION

Technical Problem

However, in the conventional support structure for the rain sensor a, it was necessary to control and inspect the quality of adhesion at the adhesion portion e of the mounting bracket b to prevent the rain sensor a from falling. Therefore, the installation work of the rain sensor a was complicated.

The present invention was made in view of these points, and it is an object of the present invention to provide a support structure for a rain sensor that does not require controlling or inspecting the quality of adhesion.

Solution to Problem

The solution of the present invention to achieve the aforementioned purpose presupposes a support structure for a rain sensor that is placed in contact with or facing an interior surface of a windshield glass of a vehicle. In this support structure for the rain sensor, a mounting bracket is fastened to a ceiling member arranged in the vicinity of the windshield glass, and the mounting bracket has an extending portion extending from a position where the mounting bracket is fastened to the ceiling member, to a position where the mounting bracket faces the windshield glass. The rain sensor is engaged with the extending portion of the mounting bracket so that the rain sensor can move back and forth with respect to the windshield glass. A coil spring is interposed between the extending portion and the rain sensor, and a light emitting/receiving surface of the rain sensor is pressed against the interior surface of the windshield glass by a biasing force from the coil spring.

According to this specified matter, there is no need to use adhesion as a means of supporting the rain sensor. This eliminates the need to control or inspect the quality of the adhesion.

In addition, a temporary support claw is protruded on a surface of the rain sensor opposite to the light emitting/receiving surface, and the extended portion of the mounting bracket is provided with an engagement hole in which the temporary support claw of the rain sensor is engaged.

As a result, in the installation work of the rain sensor, the temporary support claw of the rain sensor is engaged in the engagement hole provided in the extending portion of the mounting bracket. This allows the mounting bracket to be fastened to the ceiling member while preventing the rain sensor from falling off the mounting bracket. Therefore, the workability of the installation of the rain sensor is excellent.

The extending portion of the mounting bracket has: a sloping portion that slopes away from the windshield glass, sloping from the position where the mounting bracket is fastened to the ceiling member, toward a position where the rain sensor is installed; and a sensor support portion that extends from a tip of the sloping portion, extending in a direction along an extending direction of the windshield glass.

According to this, the distance between the windshield glass and the sensor support portion can be appropriately set by proper setting of the angle of inclination of the sloping portion and the length of the sloping portion. In other words, the distance for placing the rain sensor and the coil spring can be set appropriately between the windshield glass and the sensor support portion.

Advantageous Effects of Invention

The present invention eliminates the need to use adhesion as a means of supporting the rain sensor, thus eliminating the need to control or inspect the quality of the adhesion.

DESCRIPTION OF EMBODIMENTS

The following is an embodiment of the invention to be described based on the drawings. This embodiment describes the application of the present invention as a support structure for a rain sensor applied to the front windshield glass of an automatic driving vehicle.

—Support Structure for the Rain Sensor—

Figure 1:
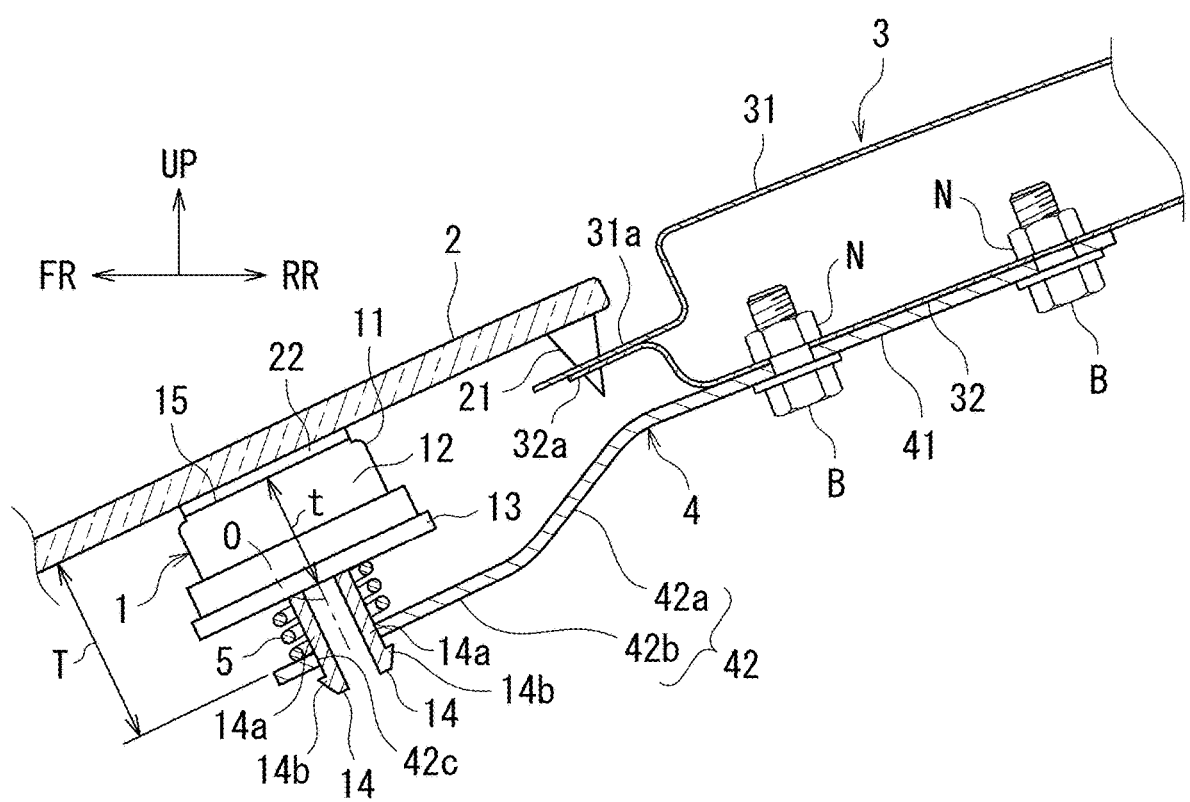
FIG. 1 shows a cross-sectional view of the rain sensor support structure.

FIG. 1 is a cross-sectional view of the support structure of a rain sensor 1. In this FIG. 1, arrow FR indicates the front direction of the vehicle body, arrow RR indicates the rear direction of the vehicle body, and arrow UP indicates the upward direction.

As shown in FIG. 1, the upper end of a front windshield glass (hereinafter simply referred to as windshield) 2 is engaged with a ceiling member 3.

Specifically, the ceiling member 3 has a roof panel 31 and a roof header panel 32. The front end of the roof panel 31 has a flange 31a. The roof header panel 32 is located below the roof panel 31. The front end of the roof header panel 32 is also provided with a flange 32a. These flanges 31a and 32a are superimposed and joined to each other. As a result, the roof panel 31 and the roof header panel 32 form a closed cross-section structure.

The windshield 2 is inclined downward at a predetermined angle toward the front of the vehicle body. The upper end of the windshield 2 is engaged to each of the flanges 31a, 32a by means of a clip 21. Although not shown in the figure, a sealant is interposed between the upper end of the windshield 2 and the respective flanges 31a, 32a. This prevents rainwater from entering between the upper end of the windshield 2 and each of the flanges 31a, 32a.

A mounting bracket 4 is fastened to the roof header panel 32. The mounting bracket 4 consists of a flat metal plate that is pressed. The mounting bracket 4 consists of a plate material that is, for example, rectangular in plan view. The mounting bracket 4 has a fastening plate portion 41 and an extending portion 42.

The fastening plate portion 41 is flat and is superimposed on the underside of the roof header panel 32 and fastened to the roof header panel 32 by bolts B, B. Specifically, weld nuts N, N are joined to the top surface of the roof header panel 32. The fastening plate portion 41 is overlaid on the underside of the roof header panel 32, and the bolts B are inserted from the underside into bolt insertion holes formed through the fastening plate portion 41 and the roof header panel 32. The bolts B are screwed into the weld nuts N. The bolts B are fastened at a total of four locations: two in the front-back direction and two in the width direction of the vehicle. These fastening points are not limited to this.

The extending portion 42 has a sloping portion 42a and a sensor support portion 42b.

The sloping portion 42a is continuous with the front end of the fastening plate portion 41. The sloping portion 42a slopes away from the windshield 2 toward the front of the vehicle body. In other words, the inclination angle of the sloping portion 42a is larger than that of the fastening plate portion 41. The inclination angle of the sloping portion 42a and the length dimension of the sloping portion 42a in the direction along the front-rear direction of the vehicle body are pre-designed as dimensions that define a distance dimension (dimension T in FIG. 1) between the sensor support portion 42b and the windshield 2 within a predetermined range. The distance dimension will be described later.

The sensor support portion 42b is continuous with the front end of the sloping portion 42a. The sensor support portion 42b is inclined downward at a predetermined angle toward the front of the vehicle body along the direction of extension of the windshield 2. Near the front end of the sensor support portion 42b, an engagement hole 42c is provided. This engagement hole 42c is a hole in which the rain sensor 1 is engaged. More specifically, this engagement hole 42c is a hole in which temporary support claws 14, 14 described below provided on the rain sensor 1 are engaged.

The rain sensor 1 includes a light emitting element and a light receiving element, not shown, housed inside a sensor casing 11. The sensor casing 11 has a casing body 12 and a casing base plate 13.

The casing body 12 is composed of a substantially cylindrical housing. The casing base plate 13 is composed of a disk continuous with the lower end of the casing body 12.

A pair of temporary support claws 14, 14 are protruded on the underside of the casing base plate 13. In FIG. 1, the temporary support claws 14, 14 are protruded on both sides of the center line 0 of the casing base plate 13. The number of temporary support claws 14 is not limited to this. For example, three or more temporary support claws 14 may be arranged around the center line 0 of the casing base plate 13.

Each temporary support claw 14 has an extending portion 14a. The extending portion 14a is continuous with the underside of the casing base plate 13 and extends downward.

The lower end of the extending portion 14a has an outwardly protruding mating projection 14b. Each of the temporary support claws 14, 14 is elastically deformable in the direction toward the centerline 0. When each of the temporary support claws 14, 14 is not elastically deformed, the dimension between the outer ends of each of the mating projections 14b, 14b is larger than the inner diameter dimension of the engagement hole 42c. Therefore, when each of the temporary support claws 14, 14 is inserted into the engagement hole 42c, the mating projections 14b, 14b of the temporary support claws 14, 14 are engaged with the inner circumferential edge of the engagement hole 42c.

The height dimension of the sensor casing 11 (dimension t in FIG. 1) is shorter than the distance dimension T between the sensor support portion 42b and the windshield 2 by a predetermined dimension. Therefore, when the temporary support claws 14, 14 are inserted into the engagement hole 42c, the rain sensor 1 can move forward and backward with respect to the windshield 2.

Around the outer circumference of the extending portions 14a, 14a of the temporary support claws 14, 14 is a coil spring 5 in a compressed state. The inner diameter of the coil spring 5 is larger than the inner diameter of the engagement hole 42c. The upper end of the coil spring 5 is in contact with the lower surface of the casing base plate 13. The lower end of the coil spring 5 is in contact with the upper surface of the sensor support portion 42b. As a result, the light emitting/receiving surface 15 of the rain sensor 1 is pressed toward the inner surface of the windshield 2 (a surface on the interior side of the car) by a biasing force from the coil spring 5.

Specifically, a silicone sheet 22 is interposed between the light emitting/receiving surface 15 of the rain sensor 1 and the inner surface of the windshield 2. Therefore, the light emitting/receiving surface 15 of the rain sensor 1 is pressed toward the inner surface of the windshield 2 through the silicone sheet 22 by the biasing force from the coil spring 5. This prevents air bubbles from entering between the light emitting/receiving surface 15 of the rain sensor 1 and the silicone sheet 22, and between the silicone sheet 22 and the inner surface of the windshield 2.

The biasing force from the coil spring 5 acts as a downward reaction force on the mounting bracket 4. This reaction force acting on the mounting bracket 4 is received by the roof header panel 32 to which the fastening plate portion 41 of the mounting bracket 4 is fastened. This roof header panel 32 is a rigid member because it constitutes a closed cross-section structure with the roof panel 31. Therefore, the mounting bracket 4 can be stably supported.

Considering the variation in the distance dimension T between the sensor support portion 42b and the windshield 2, the coil spring 5 has a relatively long spring stroke to be able to absorb this variation.

—Control System of the Rain Sensor—

Figure 2:
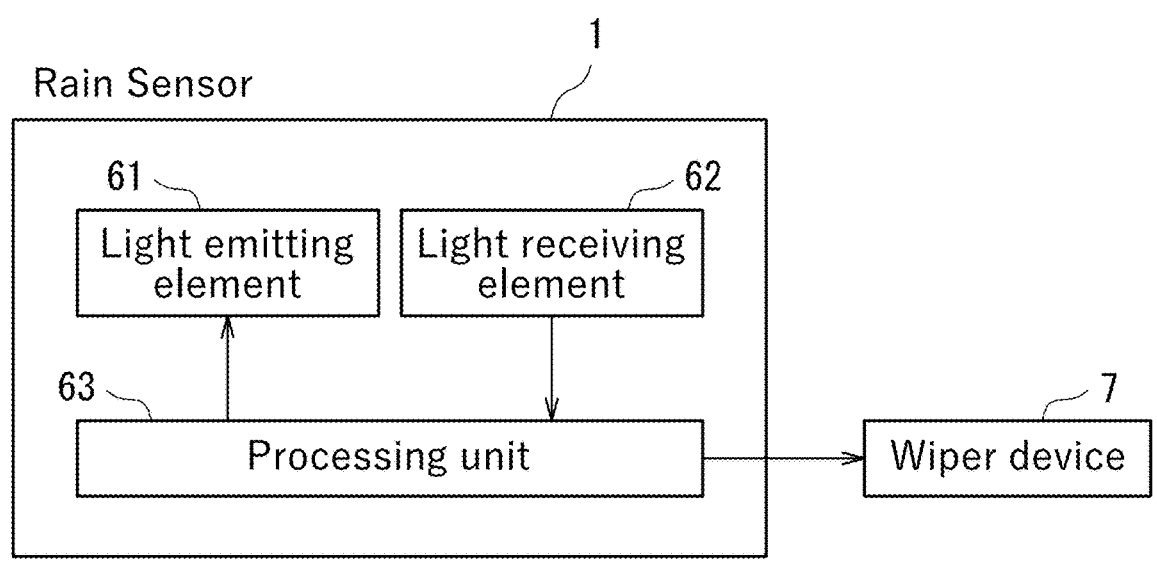
FIG. 2 is a block diagram showing a schematic of the control system of the rain sensor.
Figure 3:
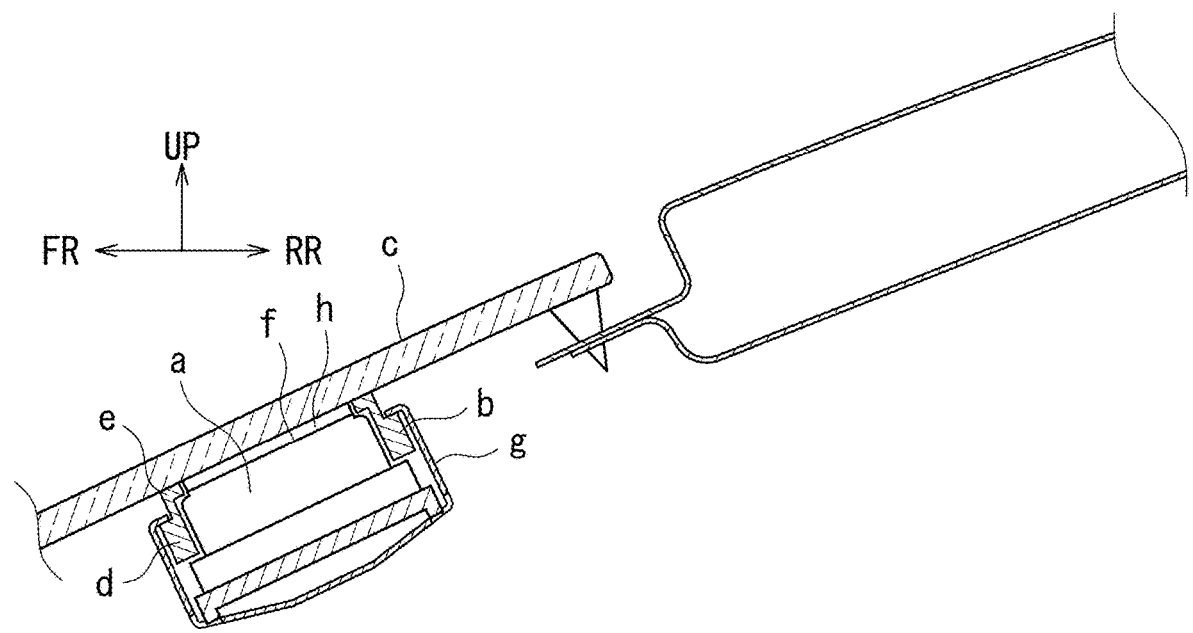
FIG. 3 is a cross-sectional view showing the support structure of a conventional rain sensor.

The control system of the rain sensor 1 will now be briefly described. FIG. 2 is a block diagram showing a schematic of the control system of the rain sensor 1. As shown in FIG. 2, the rain sensor 1 is equipped with a light emitting element 61, a light receiving element 62, and a processing unit 63. The light emitting element 61, light receiving element 62, and processing unit 63 are housed inside the sensor casing 11.

The light emitting element 61 irradiates light onto the windshield 2. The light emitting element 61 is composed of a light emitting diode.

The light receiving element 62 receives the light reflected by the windshield 2. The light receiving element 62 is composed of a photodiode.

The processing unit 63 is a control circuit having a CPU, ROM, RAM, etc., not shown, and performing signal processing in accordance with a program stored in the ROM, etc. The processing unit 63 performs processing to drive the light emitting element 61 and processing of the detection results of the light receiving element 62, and activates a vehicle wiper device 7 based on the processing results. Specifically, the wiper device 7 is activated when raindrops are detected on the outer surface of the windshield 2.

The wiper device 7 is equipped with an ECU (Electrical Control Unit), a wiper motor control circuit, and a wiper motor drive unit, and can be activated by a power supply from the vehicle battery. Wiper blades reciprocate when the wiper motor drive unit drives the wiper motor.

—Installation of the Rain Sensor—

Next, the work to obtain the support structure of the rain sensor 1 described above will be described. The work to install the rain sensor 1 includes assembling the rain sensor 1 to the mounting bracket 4, followed by fastening the mounting bracket 4 to the roof header panel 32.

First, the coil spring 5 is attached to the outside of the temporary support claws 14, 14 of the rain sensor 1. To attach the coil spring 5, the extending portions 14a, 14a of the temporary support claws 14, 14 are elastically deformed toward the center line 0.

In this state, each of the temporary support claws 14, 14 is inserted into the engagement hole 42c of the mounting bracket 4. This will cause the mating projections 14b, 14b of the temporary support claws 14, 14 to engage the inner circumferential edge of the engagement hole 42c, preventing the rain sensor 1 from falling out of the mounting bracket 4.

The mounting bracket 4 is then fastened to the roof header panel 32. In this work, the fastening plate portion 41 of the mounting bracket 4 is superimposed on the lower surface of the roof header panel 32 with the light emitting/receiving surface 15 of the rain sensor 1 facing the inner surface of the windshield 2. The bolts B are then inserted from the lower side into the bolt insertion holes formed through the fastening plate portion 41 and the roof header panel 32, and the bolts B are twisted into the weld nuts N.

As shown in FIG. 1, the coil spring 5 is then interposed between the sensor support portion 42b of the mounting bracket 4 and the rain sensor 1, and the rain sensor 1 is supported with the light emitting/receiving surface 15 of the rain sensor 1 pressed toward the inner surface of the windshield 2 by the biasing force from the coil spring 5.

Effects of the Embodiment

As explained above, in this embodiment, the mounting bracket 4 fastened to the roof header panel 32 is provided with the extending portion 42 that extends to a position facing the windshield 2. The coil spring 5 is interposed between this extending portion 42 and the rain sensor 1, and the light emitting/receiving surface 15 of the rain sensor 1 is pressed toward the inner surface of the windshield 2 by the biasing force from the coil spring 5. Therefore, there is no need to bond the rain sensor 1 to the inner surface of the windshield 2. As a result, there is no need to control or inspect the quality of the adhesion.

In particular, there is a demand for the wiper device 7 to be able to operate automatically in an autonomous vehicle. In this embodiment, the support condition of the rain sensor 1 can be obtained in a stable manner, thus increasing the reliability of the automatic operation of the wiper device 7. In addition, since there is no need to control or inspect the adhesive quality as described above, the manufacturing cost of the autonomous vehicle can be reduced.

Other Embodiments

The present invention is not limited to the aforementioned embodiment, and all variations and applications encompassed within the scope of the claims and the scope equivalent thereto are possible.

For example, the foregoing embodiment describes the case in which the present invention is applied as a support structure for the rain sensor 1 applied to the front windshield 2. The invention is not limited to this, but can also be applied as a support structure for a rain sensor applied to the rear windshield.

In the above embodiment, the silicone sheet 22 was interposed between the light emitting/receiving surface 15 of the rain sensor 1 and the inner surface of the windshield 2. The invention is not limited to this, but may also be configured so that the light emitting/receiving surface 15 of the rain sensor 1 is directly in contact with the inner surface of the windshield 2.

In the above embodiment, the case where the invention is applied to an autonomous vehicle was described. The invention is not limited to this and can be applied to non-autonomous vehicles as well.

INDUSTRIAL APPLICABILITY

The present invention is applicable to the support structure of a rain sensor.

What is claimed is:

1. A support structure for a rain sensor positioned in contact with or facing an interior surface of a windshield glass of a vehicle, wherein
a mounting bracket is fastened to a ceiling member located near the windshield glass, and the mounting bracket has an extending portion extending from a position where the mounting bracket is fastened to the ceiling member, to a position where the mounting bracket faces the windshield glass,
the rain sensor is engaged with the extending portion of the mounting bracket so that the rain sensor can move back and forth with respect to the windshield glass, and
a coil spring is interposed between the extending portion and the rain sensor so that a light emitting/receiving surface of the rain sensor is pressed against the interior surface of the windshield glass by a biasing force from the coil spring.

2. The support structure of a rain sensor according to claim 1, wherein
a temporary support claw is protruded on a surface of the rain sensor opposite to the light emitting/receiving surface, and
the extending portion of the mounting bracket is provided with an engagement hole in which the temporary support claw of the rain sensor is engaged.

3. The support structure for a rain sensor according to claim 1, wherein
the extending portion of the mounting bracket comprises: a sloping portion that slopes away from the windshield glass, sloping from the position where the mounting bracket is fastened to the ceiling member, toward a position where the rain sensor is installed; and a sensor support portion that extends from a tip of the sloping portion, extending in a direction along an extending direction of the windshield glass.

\* \* \* \* \*